United States Patent
Gu et al.

(10) Patent No.: US 11,829,769 B2
(45) Date of Patent: Nov. 28, 2023

(54) INSTRUCTION DRIVEN DYNAMIC CLOCK MANAGEMENT FOR DEEP PIPELINE AND OUT-OF-ORDER OPERATION OF MICROPROCESSOR USING ON-CHIP CRITICAL PATH MESSENGER AND ELASTIC PIPELINE CLOCKING

(71) Applicant: NORTHWESTERN UNIVERSITY, Evanston, IL (US)

(72) Inventors: Jie Gu, Evanston, IL (US); Russell E. Joseph, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 341 days.

(21) Appl. No.: 17/415,494

(22) PCT Filed: Dec. 18, 2019

(86) PCT No.: PCT/US2019/067283
§ 371 (c)(1),
(2) Date: Jun. 17, 2021

(87) PCT Pub. No.: WO2020/132140
PCT Pub. Date: Jun. 25, 2020

(65) Prior Publication Data
US 2022/0050686 A1 Feb. 17, 2022

Related U.S. Application Data

(60) Provisional application No. 62/781,411, filed on Dec. 18, 2018.

(51) Int. Cl.
*G06F 9/38* (2018.01)
*G06F 1/08* (2006.01)

(52) U.S. Cl.
CPC .............. *G06F 9/3869* (2013.01); *G06F 1/08* (2013.01)

(58) Field of Classification Search
None
See application file for complete search history.

(56) References Cited

U.S. PATENT DOCUMENTS

2003/0177409 A1* 9/2003 Greenstreet ........... G06F 9/3869 713/401
2010/0287400 A1* 11/2010 Chou .................... G06F 9/3869 713/400
2011/0219208 A1 9/2011 Asaad et al.
(Continued)

OTHER PUBLICATIONS

International Search Report and Written Opinion in International Application No. PCT/US19/67283, dated Mar. 12, 2020 (7 pages).
(Continued)

*Primary Examiner* — Michael Sun
(74) *Attorney, Agent, or Firm* — BENESCH, FRIEDLANDER, COPLAN & ARONOFF LLP (57) ABSTRACT

Systems and/or methods can include techniques to exploit dynamic timing slack on the chip. By using a special clock generator, the clock period can be shrunk as needed at every cycle. The clock period is determined during operation by checking "critical path messengers" to indicate how much dynamic timing slack exists. Elastic pipeline timing can also be introduced to redistribute timing among pipeline stages to bring further benefits.

10 Claims, 8 Drawing Sheets

(56) References Cited

U.S. PATENT DOCUMENTS

2014/0317427 A1    10/2014  Hill
2016/0118966 A1*   4/2016   Chowdhury .............. G06F 1/10
                                                         327/161

OTHER PUBLICATIONS

Jia, T. et al., "An Instruction Driven Adaptive Clock Phase Scaling with Timing Encoding and Online Instruction Calibration for a Low Power Microprocessor," 2018 IEEE, pp. 94-97 (4 pages).
Constantin, J. et al., "DynOR: A 32-bit Microprocessor in 28 nm FD-SOI with Cycle-By-Cycle Dynamic Clock Adjustment," 2016 IEEE, pp. 261-264 (4 pages).

* cited by examiner

INSTRUCTION DRIVEN DYNAMIC CLOCK MANAGEMENT FOR DEEP PIPELINE AND OUT-OF-ORDER OPERATION OF MICROPROCESSOR USING ON-CHIP CRITICAL PATH MESSENGER AND ELASTIC PIPELINE CLOCKING

CROSS-REFERENCE TO RELATED APPLICATIONS

The present application is a National Stage Entry of PCT International Patent Application No. PCT/US2019/067283 entitled "Instruction Driven Dynamic Clock Management for Deep Pipeline and Out-of-order Operational of Microprocessor using On-chip Critical Path messenger and Elastic Pipeline Clocking," filed on Dec. 18, 2019, which claims priority to and the benefit of U.S. Provisional Patent Application Ser. No. 62/781,411 entitled "Instruction Driven Dynamic Clock Management for Deep Pipeline and Out-of-order Operation of Microprocessor using On-chip Critical Path Messenger and Elastic Pipeline Clocking,"filed on Dec. 18, 2018, the disclosures of which are all hereby incorporated by reference in their entireties for all purposes.

STATEMENT OF FEDERALLY FUNDED RESEARCH OR SPONSORSHIP

This invention was made with government support under CCF1618065 awarded by the National Science Foundation. The government has certain rights in the invention.

BACKGROUND

Some microprocessor designs have reached a bottleneck with respect to improvements related to speed, e.g., which can cause delay in the transmission of data through the microprocessor. The delay can occur when a system's bandwidth cannot support the amount of information being relayed at the speed it is processed. Bottlenecks can affect microprocessor performance by slowing down the flow of information between the computer processing unit (CPU) and the memory. Dynamic voltage and frequency scaling (DVFS) is a commonly used technique. DVFS is done at program level and cannot reach the instruction level frequency scaling granularity.

DESCRIPTION

The disclosed processes enhance the efficiency and the operation microprocessors. The improved method mediates the dynamic timing slack that often exists during microprocessor operations. Dynamic timing slack refers to dynamic timing margin at each clock cycle determined by the instructions executed in the pipeline. Some clocking schemes only use worst-case timing of the design and hence do not exploit the dynamic timing slack. To overcome these shortcomings, a dynamic clock management scheme utilizes the dynamic timing slack leading to speedup of the microprocessor. An on-chip "critical path messenger" generates a signal that predicts timing of the operation to guide the scaling of clock. An elastic pipeline clock can be included where each pipeline stage can be dynamically managed to improve the speed of microprocessor.

In some examples, systems can provide energy efficient wearable devices, Internet of Things (IoT) devices, biomedical signal processing, etc. Some other applications include, low power and high performance microprocessor designs, including CPU's and graphical processing units (GPU's), low power digital signal processing (DSP) circuit designs, and/or embedded microcontrollers used in IoT or wearable devices, etc. In some examples, the systems can achieve ultra low power, easy implementation and/or low latency/computing time for such devices. For example, the system can process physiological signals, such as electromyography (EMG) or electrocardiography (ECG), in wearable devices for human assistance. Such devices can be used in broad application spaces including, but not limited to, artificial intelligence, virtual reality, gaming, biomedical rehabilitation, etc. Currently to process physiological signals, people usually rely on high-end embedded microprocessors or personal computers to perform the computing job after the signals are captured by sensors. The current state-of-art edge processing device or wearable device does not have built-in machine learning function for processing physiological signals such as EMG or ECG signals. Without the processing capability, large amounts of sensor data may need to be transferred to a centralized microprocessor leading to large communication overhead and heavy computing load to the processor. In this system, an integrated circuit includes a built-in machine learning capability, distributed networking capability and special body channel communication, in some examples achieving more than about ten thousand times lower power than microprocessors, and avoiding communication bottlenecks at the microprocessor.

An adaptive clock management scheme exploits instruction based dynamic timing slack (DTS) for a general purpose graphic processor unit with deep pipeline and out-of-order execution. Some advantages include single instruction level clock scaling leading to performance gain and energy saving by exploiting dynamic timing slack at instruction level. The elastic pipeline clocking allows redistribution of timing among pipeline stages as needed leading to further performance gain and energy saving.

Different from the critical path delay reported by the static timing analysis (STA), cycle-by-cycle dynamic timing slack (DTS) has been widely observed at both program level and instruction levels, with examples of workload-dependent Vmin in commercial processors. Conventional DVFS works at program level and does not provide inadequate frequency scaling granularity for instruction level timing management. Razor based techniques essentially leverage error detection to exploit the DTS at cycle-by-cycle basis. However, it requires additional error-detection circuits and architecture-level co-development for error recovery. Supply droop based adaptive clocking was also proposed to reduce timing margin under PVT variation. Recently, instruction based dynamic clock schemes were proposed to enhance CPU's operation based on timing variation of instructions executed at different pipeline stages. A transitional STA is developed or evaluating the dynamic timing slack at various instruction setting. For each pipeline stage, the input/output register conditions are predefined during the transitional timing analysis. Instruction-dependent timing slack is observed.

Figure 5:
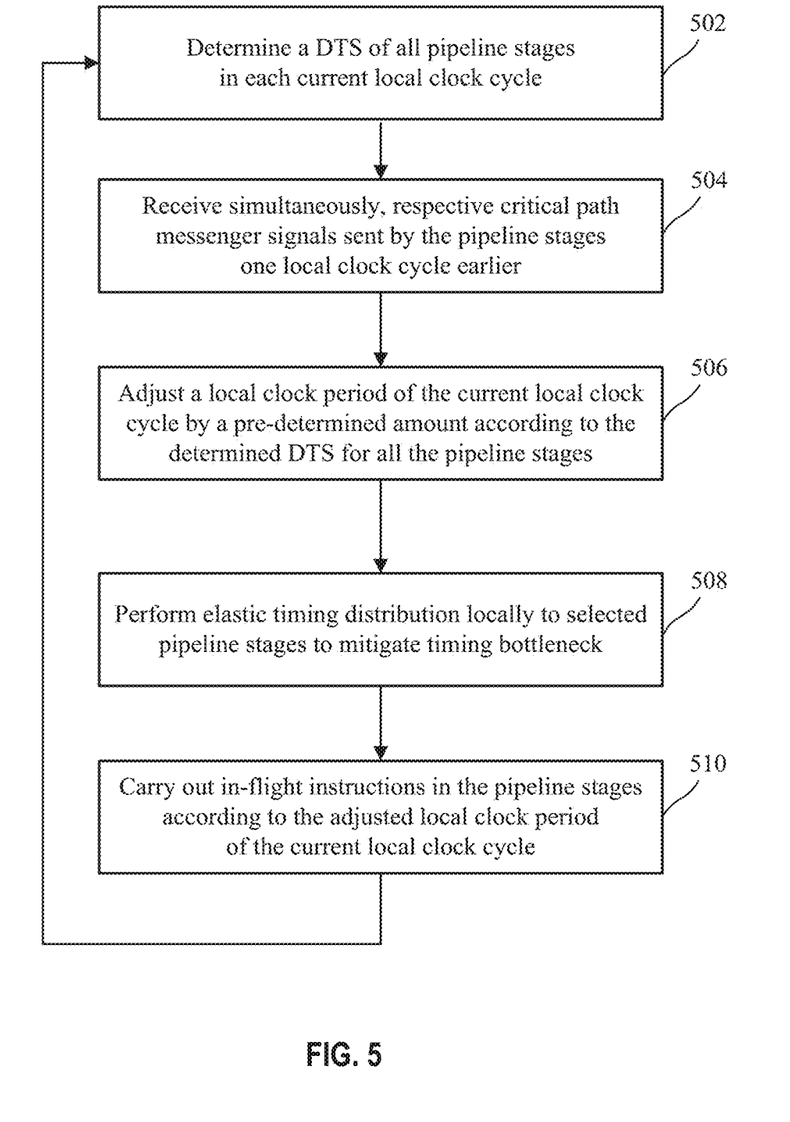
FIG. 5 illustrates a flow chart of a representative dynamic clock management scheme.

FIG. 5 illustrates a flow chart of a dynamic clock management scheme for executing instructions in deep pipeline stages 210-228 of a processor 200, such as a graphical processor unit (GPU). At step 502, the local clock generator 240 may determine a dynamic timing slack (DTS) of all pipeline stages 210-228 in each local clock cycle 1-5, wherein the DTS is a time margin 108 between an actual timing period 102 and a worst-case clock period 104 to process all in-flight instructions by all the pipeline stages 210-228 of a computing unit (CU) 201 at a current local clock cycle 2, wherein the pipeline stages 210-228 in the CU 201 may include: a first sequence of control pipeline stages 210-216 followed by a second sequence of task execution pipeline stages 220-228.

In practice, all pipeline stages 220-228 execute some instructions (referred in the claim as in-flight instructions), and each pipeline stage has some timing requirement. A worst case time period 104 among the ten pipeline stages 220-228 for each local clock cycle 1-5 is therefore chosen to avoid bottleneck. For example, every pipeline stage 220-228 in clock cycles 1-3 should see an identical clock period waveforms 151-153, respectively.

In the processor 200 (such as a microprocessor), all pipeline stages 220-228 are working simultaneously. At every clock cycle 1-5, each pipeline stage 220-228 may carry out different instructions. For instance, an "ADD" instruction may pass through every control pipeline stage 210-216 (e.g. IF, ID, EX, WB, etc.). At each pipeline stage, each instruction may perform different tasks. For example, at "IF" pipeline stage 210, instruction "ADD" may be launched from instruction cache buffer 232. At "ID" pipeline stage 214, the instruction "ADD" may be decoded into an "addition" task. So, one instruction may need to go through every control pipeline stage (210-216) to finish its job. For every clock cycle 1-5, each control pipeline stage 210-216 may perform different instructions.

At step 504, the DTS determination may include receiving simultaneously respective critical path messenger signals 272-280 sent one local clock cycle earlier. For example, the messenger signals received in clock cycle 2 from each of the first sequence of control pipeline stages 210-216 and the second sequence of execution pipeline stages 218-228 may be detected in clock cycle 1, and the messenger signals 272-282 may be used for DTS determination and clock period adjustment in clock cycle 2.

The respective critical path messenger signal 272-278 sent from each of the first sequence of control pipeline stages 210-216 may be triggered by a detection of a data transitioning 261 and a presence of a critical path 265 corresponding to a particular pipeline stage in the first sequence of control pipeline stages 210-216 sent one local clock cycle earlier. In addition, the respective critical path messenger signals 282 sent from each of the second sequence of task execution pipeline stages 218-228 may be triggered by receiving of a real-time issued instruction Opcode 280 or function code corresponding to a particular pipeline stage in the second sequence of task execution pipeline stages sent one local clock cycle earlier.

In practice, the "messengers" signals 272-280 may be detected at each stage and use the worst case for every clock cycle. For "non-execution" or control pipeline stages 210-216, the worst-timing (required clock cycle) is based on the real-time detected "messenger" signals 272-278 while in the "execution" pipeline stages 218-228, OPcode instructions 280, such as e.g. "ADD" or "SUB" may be used to determine the worst-case timing needed for the current clock cycle 1. The messenger signals 272-278 from the control pipeline stages 210-216 and the Opcode instructions 280 from the execution pipeline stages 218-228 may be combined to determine the worst-case timing 104, i.e. the longest clock cycle to apply for each of the current clock cycles 1-5. For example, in a current clock cycle 2, pipeline stage 212 (second pipeline stage) may receive a messenger signal 274 during an earlier clock cycle 1 which indicates that the critical path delay in pipeline stage 212 may be the longest. Therefore, a clock period 152 in the current clock cycle 2 may be adjusted to ensure that all the pipeline stages 210-228 in the current clock cycle 2 would be executed with no bottleneck.

In step 504, the local clock period 151 of the current local clock cycle 2 may be adjusted by a pre-determined amount 155 according to the determined DTS for all the pipeline stages 210-228. The adjusting may be to increase or decrease a local clock period 152 at the current local clock cycle 2, by a predetermined amount of time 155 according to the determined DTS, for all the pipeline stages 210-228.

Figure 3A:
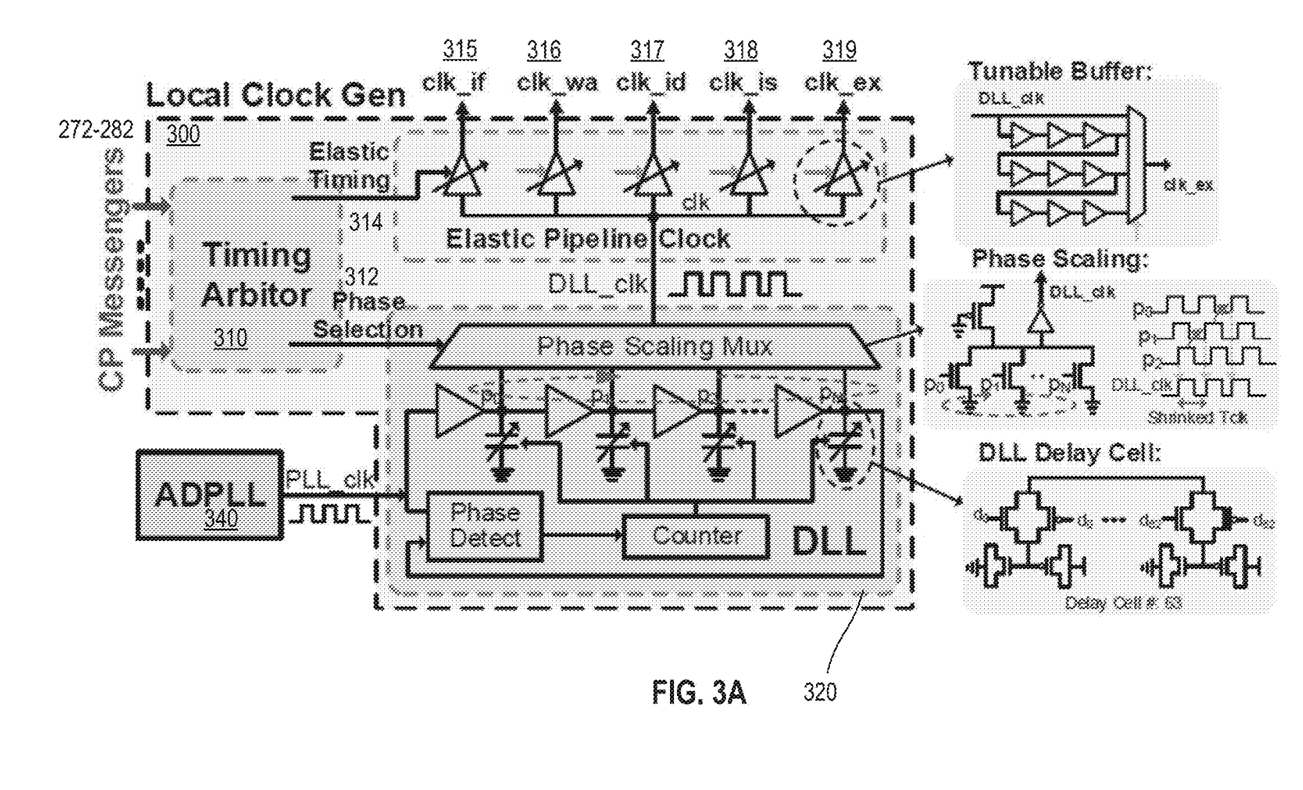
FIG. 3A is a block diagram of an example hierarchical clocking scheme.

Referring to FIG. 3A, the adjusting of the local clock period 152 in current local cycle 2 may be accomplished by adjusting a phase 312 of an on-chip delay locked loop (DLL) local clock generator 300 to cause a rising edge of the local clock period to shift forward or backward by a time duration according to the determined DTS at the current local clock cycle 2. FIG. 3A further shows an on-chip timing arbiter circuit 310, which upon receiving one local clock cycle earlier, the messenger signals 272-282 from the pipeline stages 210-228, the on-chip timing arbiter circuit 310 may send a phase selection signal 312 to select a suitable amount of phase adjustment to the on-chip DLL local clock generator 320. The phase adjustment of the on-chip DLL local clock generator 320 may result in shifting a rising edge 137 of the current clock cycle 2 to start earlier or to start later by a predetermined amount according to the determined DTS in local clock cycle 2 (through the received messenger signal one clock cycle earlier).

Figure 1:
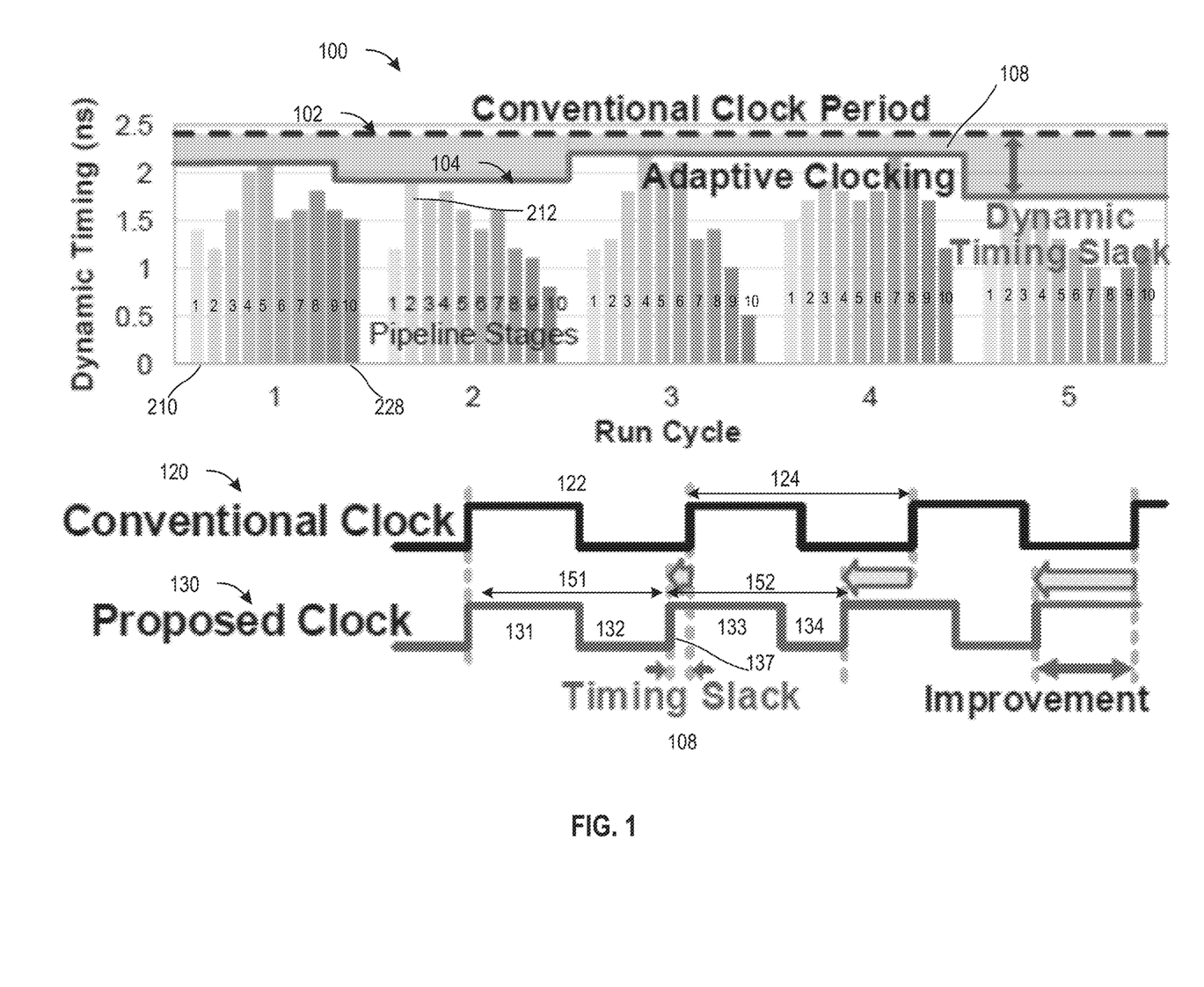
FIG. 1 illustrates dynamic timing slack observed at instruction level.

Referring to FIG. 1, after the adjustment, the adjusted clock period waveform may no longer be symmetrical, i.e. not 50% duty cycle in both a high first period 131 and a low second period 132. In the case of the adjusted local clock period 152 of local clock cycle 2, it is shown in FIG. 1, that the high period 133 may still maintains at 50% of an unadjusted constant local clock cycle 124, while the second low period 134 may be less than 50% of the unadjusted constant local clock cycle 124. In practice, the computing unit (CU) operates on a rising edge 137 of each clock cycle, therefore an adjusted clock period 152 would not affect the execution timing of the pipeline stages 210-228.

Figure 4A:
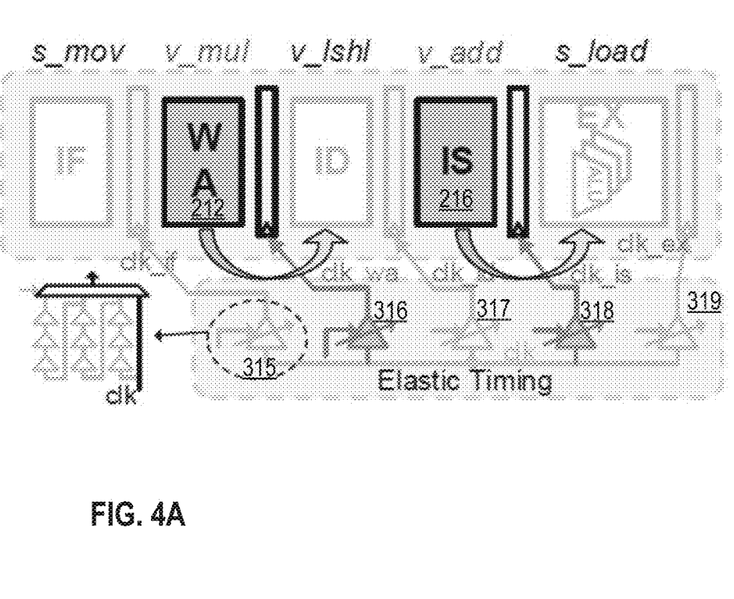
FIGS. 4A-4C illustrate an elastic timing redistribution scheme across pipelines for machine learning.

At step 508 and referring to FIG. 4A, it may be determined from the messenger signals 274, 278 received one clock period earlier (i.e., in clock cycle 1) that pipeline stages "WA" 212 and pipeline stage "IS" 216 both may have a potential timing error due to critical path delay. The on-chip timing arbiter circuit 310 may selectively perform some fine tune adjustment to mitigate a timing bottleneck to both control pipeline stages 212 and 216 through an elastic timing redistribution scheme.

More specifically, on-chip timing arbiter circuit 310 may send an elastic timing signal 314 to fine tune locally the clock period of the selected pipeline stages 212, 216. Such fine tuning however, does not affect the already adjusted clock period of pipeline stage 210, 216 and 218, because the fine tuning is performed at a local clock circuit level and adjusted individually without interacting with the on-chip DLL local clock generator 320. The elastic timing signal 314 may cause an additional phase adjustment to only the pipeline clock circuits 316 and 318, such that the clock cycle period 330 which is sent to all the pipeline stages from the on-chip DLL local clock generator 320, is locally increased in pipeline stage 212 from clock period to a clock period 332, and locally increased in pipeline stage 216 from clock period to a clock period 334. However, the clock cycle period of the subsequent pipeline stages 214 and 218 are being redistributed through being "squeezed" from the initial clock period 330 to a redistributed clock period 336 and clock period 338, respectively.

In another example, the dynamic clock management method may be machine trained to automatically redistribute the clock period within the control pipeline stages to ease bottleneck, without "squeezing" the clock period of the remaining pipeline stages if at least one of the control pipeline stages 210-216 have been determined to suffer from timing error due to insufficient margin to the clock period.

When the control pipeline stage 212 is determined to have insufficient timing margin with the initially adjusted clock period 340 provided by the on-chip DLL local clock generator 320, the timing arbiter 310 may be trained to send an elastic timing signal 314. The elastic timing signal 314 automatically tunes all the control pipeline stages 210-216, locally by adjusting a phase of all the clock circuits 315-318 for the control pipeline stages 210-216. Accordingly, the clock period 340 may be uniformly adjusted further to a new local clock period 350 for all of the control pipeline stages 210-216. In this regard, none of the control pipeline stages 210-216 are "squeezed" to jeopardize their instruction executions in the pipeline stages.

Nevertheless, to keep a constant clock period, at least one of the last execution pipeline stages 220-228 may pay a penalty of being "squeezed" or reduced by a same amount of total additional time margins added to the one or more selected first sequence of control pipeline stages 210-218, in order to keep the local clock period constant to maintain smooth operations for a next local clock cycle.

At step 510, the pipeline stages may execute in real-time at the current clock cycle 2, the in-flight instructions in each of the pipeline stages 210-228, according to the adjusted local clock period 153 (or the further adjusted clock period if elastic time redistribution is implemented), and repeat execution of subsequent in-flight instructions in each of the pipeline stages 210-228 according to a subsequent adjusted local clock period 153, wherein the subsequent adjusted local clock period 153v is dynamically adjusted according to a subsequent determined DTS at a subsequent clock cycle 3.

The disclosed dynamic clock management method may solve problems common in a multi-core processor architecture having a plurality of CUs 201-202. The problems occur when the execution pipeline stages in each CU execute in-flight instructions independent of the other CUs 202, and the executions are out-of-order from each other under respective local clock periods generated by their own on-chip DLL local clock generators. The method may also allow each CU accesses a same level two (L2) cache memory 250 shared with the other CUs 202, through a scheduler 247 of an asynchronous memory interface 248, wherein the on-chip DLL local clock generator 240 of each respective CU 201, 202 is synchronized to a same on-chip digital phase locked (PLL) global clock 340 according to a hierarchical clock distribution system 360.

FIG. 1 shows the simulated dynamic timing slack across 10 pipeline stages of GPGPU used in this work showing the histogram of wide timing distribution. Existing works are based on simple in-order pipeline preventing the adoption of the techniques to more complex out-of-order architecture. Secondly, all existing work has shallow pipelines. With deep pipeline and multi-core operation, every stage can become timing bottleneck rendering difficulty in timing management task across pipeline stages and lacks of clock synchronization across domains, e.g. multi-cores and memory. Thirdly, there is lack of solution in existing work when the critical non-execution pipeline stages become timing bottleneck limiting the performance benefit of the techniques. To solve the challenges, an instruction based adaptive clock management scheme can be utilized with the following techniques: (1) on-chip critical path "messengers" which, different from critical paths, predict the appearances of critical path one cycle earlier for dynamic clock scaling;

Combination of real-time messengers and multi-stage timing arbiter circuits provide an in-situ cycle-by-cycle clock management to the out-of-order deep pipeline operation; (2) hierarchical clock circuitry including global PLL, local DLL, asynchronous clock interface for multi-core clock management across clock domains; (3) elastic pipeline clocking scheme to enhance neural network operation mitigating timing bottleneck generated from non-execution stages.

Figure 2A:
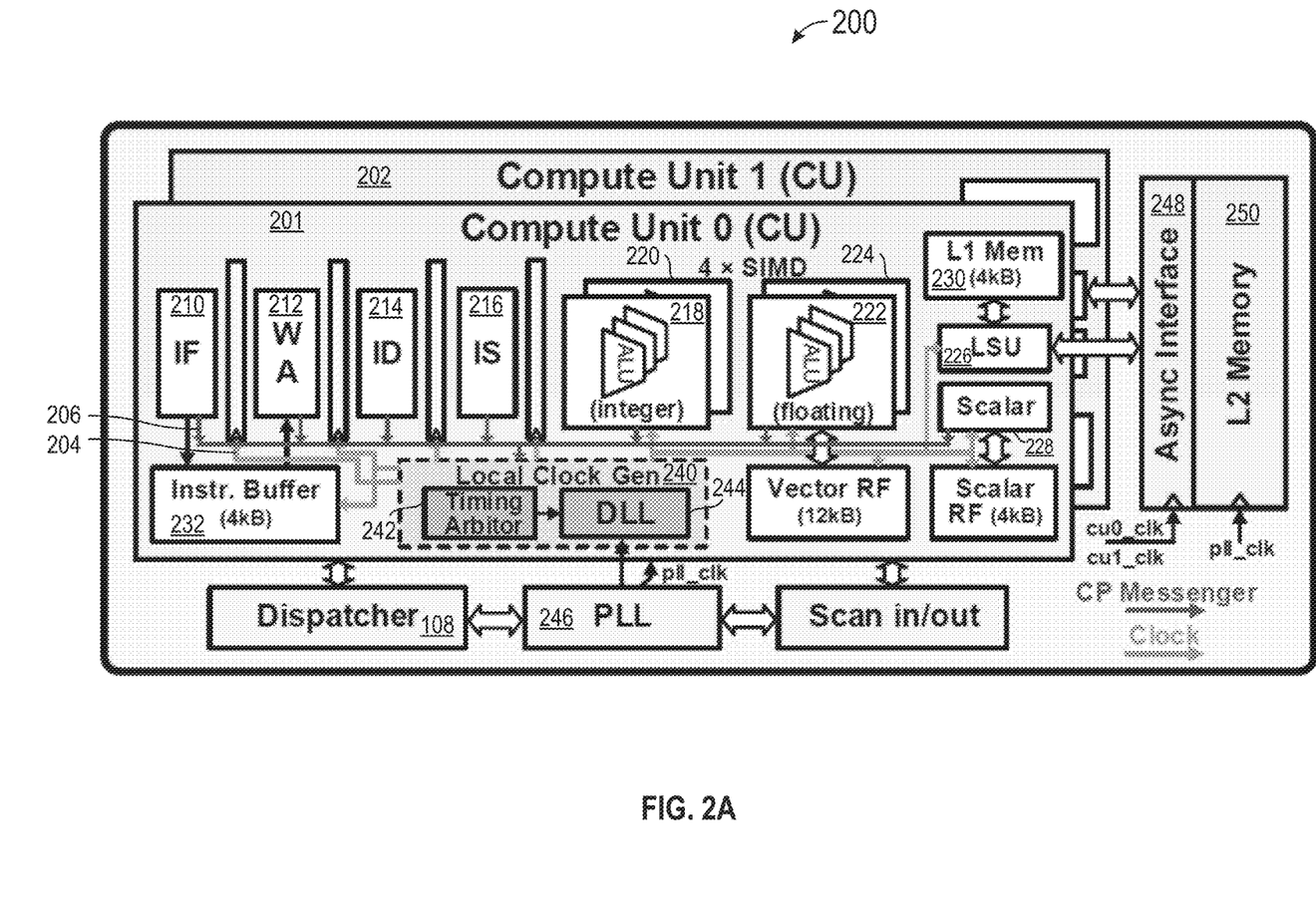
FIG. 2A is a block diagram of an example graphic processor.
Figures 2B, 2C:
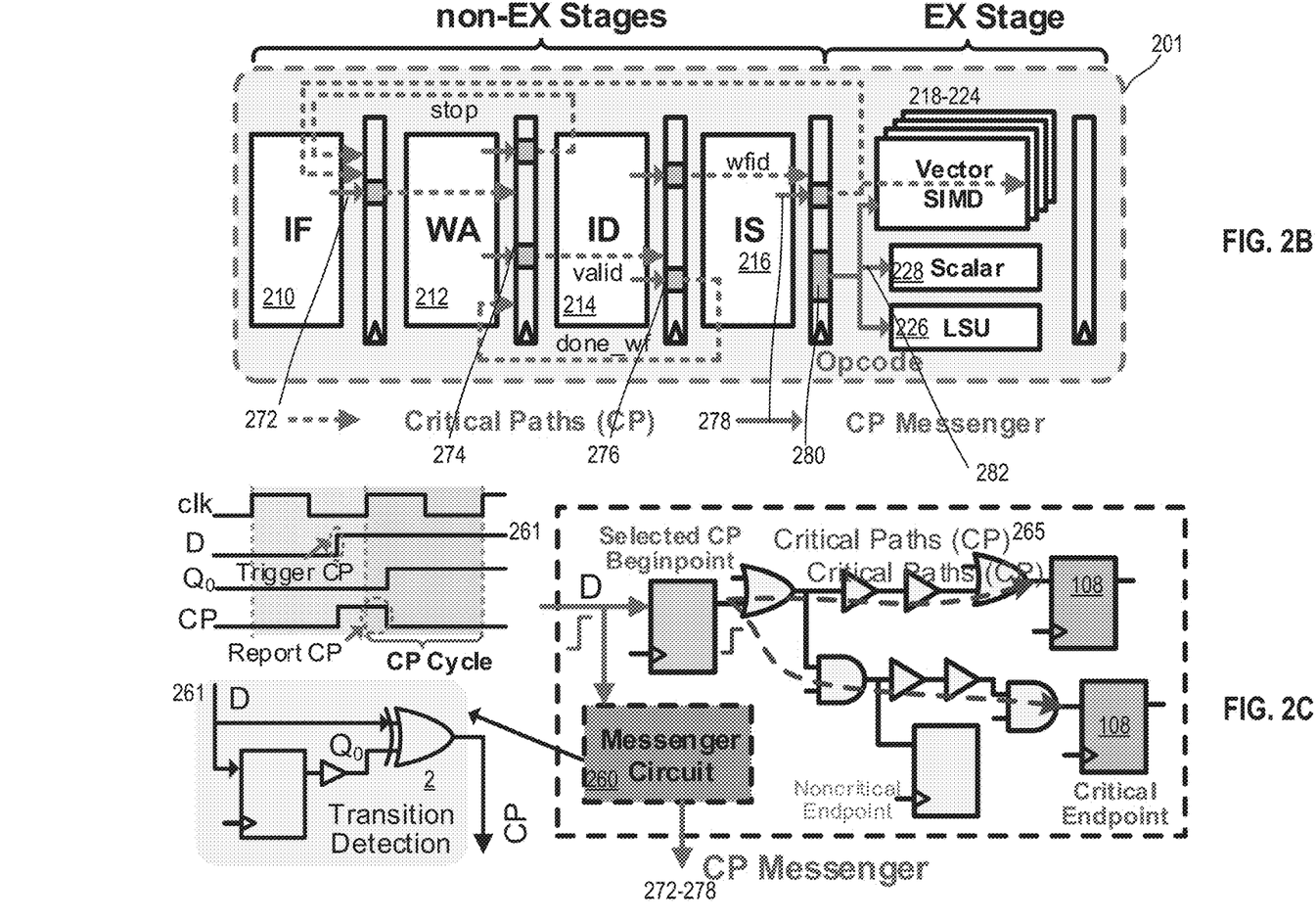
FIG. 2B illustrates representative critical paths.
FIG. 2C illustrates an on-chip critical paths messenger circuit in the system.

FIG. 2 shows the system diagram and the pipeline architecture of the implemented GPGPU processor, which includes two CUs, each with 10 pipeline stages. Inside the execution stage, there are 4 SIMD vector modules with both integer and floating modules, and a Scalar ALU. The two CUs shares a L2 memory bank for the data communication through an asynchronous interface. Critical path messenger may pessimistically predict the appearance of a critical path in the next clock cycle. Two types of messengers are used. For non-execution stage, such as a Fetch, Wavepool, etc., for example, the critical paths of control paths are traced at the roots of the operation, such as within the D pin of the flip-flops. The messenger is formed by detection of transition of the critical signals delivering a clock cycle lead time for clock controller to react. The detection of begin point of critical paths significantly reduced the numbers of monitoring nodes due to the control flow of the pipeline stages. Overall, only less than one percent of registers are selected as messengers leading to negligible overhead. For the execution stage, the out-of-order issued instruction opcode are used as messengers to explore instruction level timing variation. The selection of messengers are decided through an internally developed transitional static-timing analysis approach where cycle-by-cycle critical paths are identified at given pipeline conditions.

Figure 3B:
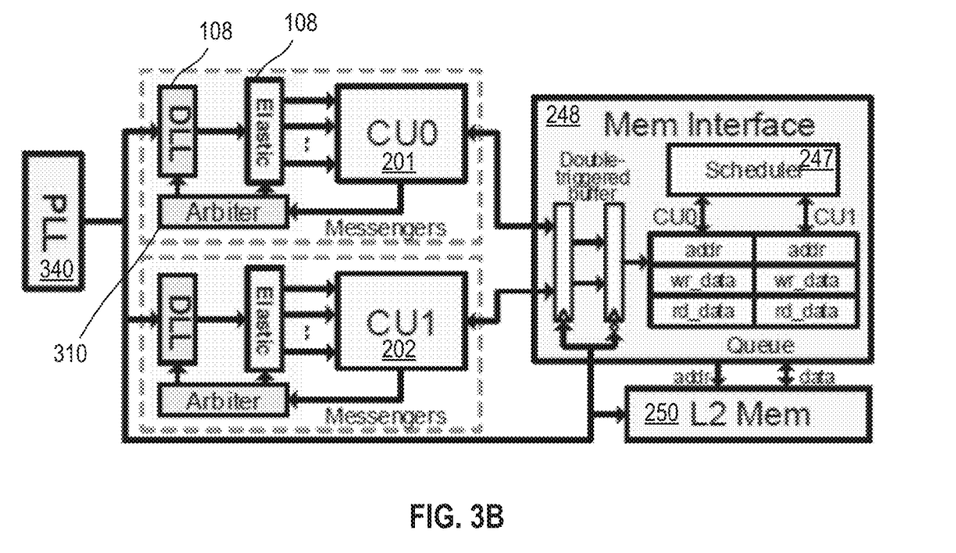
FIG. 3B illustrates an example of hierarchical clock distribution.
Figure 3C:
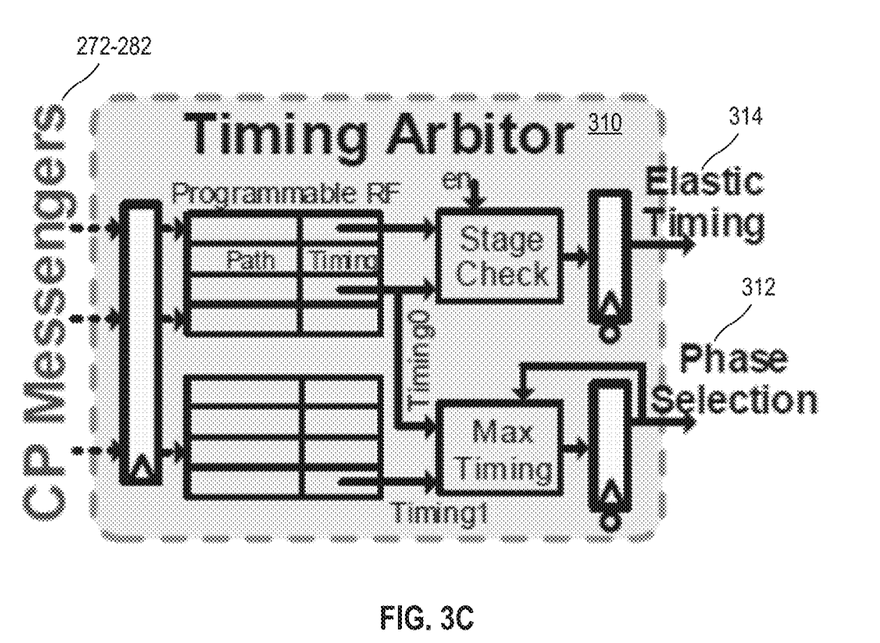
FIG. 3C illustrates an on-chip timing arbiter.

FIG. 3A-3C shows the hierarchical clocking scheme enabling instruction level clock phase scaling. A global PLL delivers clock to local delay locked lock (DLL) for each CU and associated L1 cache. The delayed phases on the DLL delay chain are carefully matched and delivered through a glitch-free multiplexer leading to cycle-by-cycle clock period adjustment. At each CU, a timing arbiter combines "messengers" from all pipeline stages and arbitrate the clock period for the current cycle. For simplicity, only dynamic shrinking of a clock period is allowed. Due to dynamic phase scaling of each CU, an asynchronous interface is used to establish data communication between two CUs and L2 caches. A double-triggered data buffer is used to ensure proper latching of the incoming data even with misalignment of clock phases.

Figure 4B:
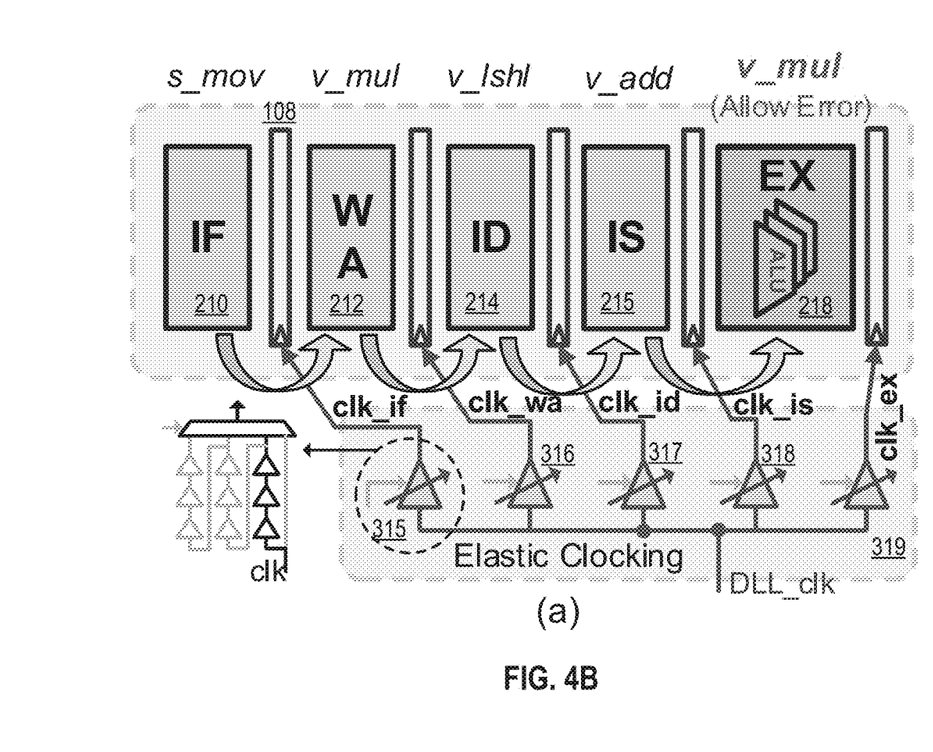
Figure 4C:
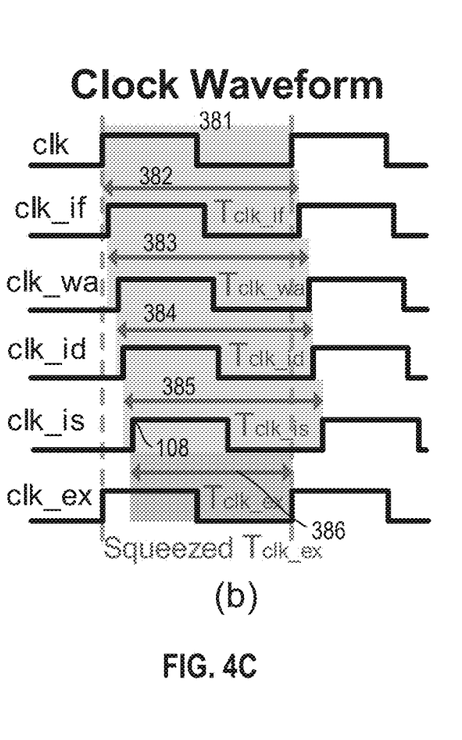

To enhance the performance of GPGPU for machine learning application, an elastic clocking mode is created by allowing additional timing margin into non-execution stages removing timing bottleneck from non-execution stages as in FIG. 4A-4C. Essentially, the timing is redistributed across stages to balance the operation. Tunable delay modules are inserted at the root of clock distribution of each pipeline stage rendering elasticity of timing margin at each stage. When the messenger inside one stage is observed while the following stage does not receive messenger, the clock of the following registers is delayed without changing the DLL clock. The redistribution propagates until reaching execution stage where timing errors are tolerable to certain programs, e.g. neural network. Selective min-delay padding was performed for this special mode at non-Execution stages, leading to 1.6% area overhead.

While various embodiments have been described, it can be apparent that many more embodiments and implementations are possible. Accordingly, the embodiments are not to be restricted.

We claim:

1. A dynamic clock management method for executing instructions in deep pipeline stages of a processor, comprising:
   determining a dynamic timing slack (DTS) of all pipeline stages in each local clock cycle, wherein the DTS is a time margin between an actual timing period and a worst-case clock period to process all in-flight instructions by all the pipeline stages of a computing unit (CU) at a current local clock cycle, wherein the pipeline stages in the CU comprise: a first sequence of control pipeline stages followed by a second sequence of task execution pipeline stages;
   adjusting by increasing or decreasing a local clock period at the current local clock cycle, by a predetermined amount of time according to a determined DTS, for all the pipeline stages;
   executing in real-time at the current clock cycle, the in-flight instructions in each of the pipeline stages according to an adjusted local clock period; and
   repeat execution of subsequent in-flight instructions in each of the pipeline stages according to a subsequent adjusted local clock period, wherein the subsequent adjusted local clock period is dynamically adjusted according to a subsequent determined DTS at a subsequent clock cycle.

2. The dynamic clock management method of claim 1, wherein the DTS determination comprising receiving simultaneously respective critical path messenger signal sent one local clock cycle earlier, from each of the first sequence of control pipeline stages and the second sequence of execution pipeline stages.

3. The dynamic clock management method of claim 2, wherein the respective critical path messenger signal sent from each of the first sequence of control pipeline stages is triggered by a detection of a data transitioning and a presence of a critical path corresponding to a particular pipeline stage in the first sequence of control pipeline stages sent one local clock cycle earlier.

4. The dynamic clock management method of claim 2, wherein the respective critical path messenger signal sent from each of the second sequence of task execution pipeline stages is triggered by receiving of a real-time issued instruction Opcode or function code corresponding to a particular pipeline stage in a second sequence of task execution pipeline stages sent one local clock cycle earlier.

5. The dynamic clock management method of claim 1, wherein the adjusting of the local clock period comprising adjusting a phase of an on-chip delay locked loop (DLL) local clock generator to cause a rising edge of the local clock period to shift forward or backward by a time duration according to the determined DTS at the current local clock cycle.

6. The dynamic clock management method of claim 5, wherein the adjusting of the phase of the on-chip DLL local clock generator comprising communicating to an on-chip timing arbiter circuit to select a suitable amount of phase adjustment to the on-chip DLL local clock generator.

7. The dynamic clock management method of claim 6, wherein the on-chip timing arbiter circuit performs an elastic timing redistribution locally and individually, by adding an additional phase adjustment to provide additional timing margin to the local clock period in order to mitigate a timing bottleneck to one or more selected first sequence of control pipeline stages.

8. The dynamic clock management method of claim 7, wherein the an elastic timing redistribution further comprising the on-chip timing arbiter circuit fixing the local clock period of one or more of the second sequence execution pipeline stages at the current local clock cycle, such that a second period of the local clock period of the second sequence execution pipeline stages is reduced by a same amount of total additional time margins added to the one or more selected first sequence of control pipeline stages, in order to keep local clock period constant to maintain smooth operations for a next local clock cycle.

9. The dynamic clock management method of claim 1, wherein the CU is one of a multi-core CUs within a processor, and the execution pipeline stages in each CU executes in-flight instructions independently and out-of-order from each other according to a local clock periods generated by its own on-chip DLL local clock generators.

10. The dynamic clock management method of claim 9, wherein each CU accesses a same level two (L2) cache memory through a scheduler of an asynchronous memory interface, wherein an on-chip DLL local clock generator of each CU is synchronized to a same on-chip digital phase locked (PLL) global clock according to a hierarchical clock distribution system.

* * * * *